United States Patent
Acero et al.

(10) Patent No.: US 12,304,863 B2
(45) Date of Patent: *May 20, 2025

(54) RECYCLED CONCRETE WASTE POWDER AND AGGREGATES WITH HEAVY OIL FUEL ASH FOR PRODUCING A GREEN FLOWABLE BACKFILL MATERIAL

(71) Applicants: SAUDI ARABIAN OIL COMPANY, Dhahran (SA); King Fahd University of Petroleum & Minerals, Dhahran (SA)

(72) Inventors: Carlos Acero, Dhahran (SA); Muhammed Kalimur Rahman, Dhahran (SA); Zakariya Saleh Al-Helal, Dhahran (SA); Mohammed Ibrahim, Dhahran (SA); Luai Alhems, Dhahran (SA); Mohammed Salihu Barry, Thoqbah (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 417 days.

This patent is subject to a terminal disclaimer.

(21) Appl. No.: 17/862,206

(22) Filed: Jul. 11, 2022

(65) Prior Publication Data

US 2022/0348498 A1    Nov. 3, 2022

Related U.S. Application Data

(63) Continuation-in-part of application No. 16/815,805, filed on Mar. 11, 2020, now Pat. No. 11,434,168.

(51) Int. Cl.
  *C04B 18/08* (2006.01)
  *C04B 7/02* (2006.01)
  *C04B 18/167* (2023.01)

(52) U.S. Cl.
  CPC .............. *C04B 18/087* (2013.01); *C04B 7/02* (2013.01); *C04B 18/167* (2013.01)

(58) Field of Classification Search
  CPC ....... C04B 18/087; C04B 7/02; C04B 18/167; C04B 2111/00724; C04B 2201/50; C04B 28/04; Y02W 30/91
  See application file for complete search history.

(56) References Cited

U.S. PATENT DOCUMENTS

| | | |
|---|---|---|
| 6,821,336 B1 | 11/2004 | Ramme et al. |
| 7,390,444 B2 | 6/2008 | Ramme et al. |
| 8,444,761 B2 | 5/2013 | Al-Mehthel et al. |
| 8,945,300 B2 | 2/2015 | Al-Mehthel et al. |
| 9,150,455 B2 | 10/2015 | Al-Mehthel et al. |
| 9,249,304 B2 | 2/2016 | Al-Mehthel et al. |
| 11,078,117 B2 | 8/2021 | Nissinen et al. |
| 11,434,168 B2 * | 9/2022 | Al-Helal ................. C04B 28/04 |
| 2002/0162484 A1 | 11/2002 | Ramme et al. |
| 2011/0067601 A1 | 3/2011 | Fried |
| 2013/0104779 A1 | 5/2013 | Al-Mehthel et al. |
| 2013/0118382 A1 | 5/2013 | Al-Mehthel et al. |
| 2015/0122148 A1 | 5/2015 | Wahhab et al. |
| 2017/0283319 A1 | 10/2017 | Maslehuddin et al. |
| 2018/0265405 A1 | 9/2018 | El Naggar et al. |
| 2019/0284804 A1 | 9/2019 | Ibrahim et al. |
| 2020/0102248 A1 | 4/2020 | Alkhatib et al. |
| 2020/0290925 A1 | 9/2020 | Skocek et al. |
| 2022/0340490 A1 * | 10/2022 | Al-Helal ................. C04B 18/06 |
| 2022/0348498 A1 | 11/2022 | Acero et al. |

FOREIGN PATENT DOCUMENTS

| | | |
|---|---|---|
| BR | 102017027894 A2 | 7/2017 |
| CN | 1137496 A | 12/1996 |
| CN | 101157527 A | 4/2008 |
| CN | 102503191 A | 6/2012 |
| CN | 102701615 A | 10/2012 |
| CN | 104844111 A | 8/2015 |
| CN | 108203270 A | 6/2018 |
| CN | 108264292 A | 7/2018 |
| CN | 113045264 A | 6/2021 |
| IL | 105654 A | 6/1997 |
| IL | 115988 A | 9/1999 |
| KR | 100562594 B1 | 3/2006 |
| KR | 101115950 | 2/2012 |
| KR | 1014871790000 B1 | 1/2015 |

(Continued)

OTHER PUBLICATIONS

Achtemichuk et al., The utilization of recycled concrete aggregate to produce controlled low-strength materials without using portland cement. Cement & Concrete Composites 2009;31:564-9.

Al-Osta, et al., "Study Of Heavy Fuel Oil Fly Ash For Use In Concrete Blocks And Asphalt Concrete Mixes," Advances in Concrete Construction, vol. 4, Issue 2, 2016, pp. 123-143.

Benlamoudi, et al., "Incorporation of Alternative Fuels and Raw Materials (AFR) to Produce a Sustainable Cement," International Journal of Engineering & Technology, 7(4.30), 136-140 (2018).

Bernal, et al., "Management and Valorisation of Wastes Through Use in Producing Alkali-Activated Cement Materials," Journal of Chemical Technology and Biotechnology, 91 (9). pp. 2365-2388 (2016).

(Continued)

*Primary Examiner* — Anthony J Green

(74) *Attorney, Agent, or Firm* — Bracewell LLP; Constance G. Rhebergen; Eleanor T. Porter

(57) ABSTRACT

Compositions and methods of forming compositions for a controlled low strength material (CLSM) comprising heavy oil fuel ash (HOFA) and recycled concrete powder (RCP) waste with natural and recycled aggregates and water are provided. In some embodiments, small quantities of Portland cement are also utilized. The recycled concrete powder contains primarily calcite and quartz. The CLSM can be used as a flowable compacted fill in structural and non-structural construction applications.

20 Claims, 8 Drawing Sheets

(56) References Cited

FOREIGN PATENT DOCUMENTS

| KR | 101487179 B1 | 2/2015 |
|---|---|---|
| TW | I307335 B | 3/2009 |

OTHER PUBLICATIONS

Camilleri et al., "The Microstructure and Physical Properties of Heavy Oil Fuel Ash Replaced Portland Cement for Use in Flowable Fill Concrete and the Production of Concrete Masonry Units", Construction and Building Materials, vol. 38, 2013, pp. 970-979.

Dobiszewska, et al., "Investigating the Influence of Waste Basalt Powder on Selected Properties of Cement Paste and Mortar," IOP Conf. Ser.: Mater. Sci. Eng., 245, 2017.

Folliard, et al., "Development of a Recommended Practice for Use of Controlled Low-Strength Material in Highway Construction," National Academies of Sciences, Engineering, and Medicine, 2008, 150 pages.

Ibrahim et al., "A review on utilization of industrial by-products in the production of controlled low strength materials and factors influencing the properties", Construction and Building Materials, vol. 325, 2022, 126704.

International Search Report and Written Opinion for related PCT application PCT/US2020/021967 dated Jun. 15, 2020.

Kuo, et al., Engineering properties of controlled low-strength materials containing waste oyster shells. Construction and Building Materials 46, 128-133, 2013.

Liu, et al., "A Study on the Relationships between Water Film Thickness, Fresh Properties, and Mechanical Properties of Cement Paste Containing Superfine Basalt Powder (SB)," Materials, 14, 2021.

Mofarrah, et al., "Investigation of the Potential Use of Heavy Oil Fly Ash as Stabilized Fill Material for Construction," Journal of Materials in Civil Engineering, vol. 24, No. 6, pp. 684-690, 2012.

N. Rajendran, "Controlled Low Strength Materials (CLSM)," American Concrete Institute, Committee 229, ACI 229R-94 Report, 1994.

Paya et al., "Properties of Portland cement mortars incorporating high amounts of oil-fuel ashes", Waste Management, 1999, pp. 7.

Ponzi, et al., "Basalt Powder as a Supplementary Cementitious Material in Cement Paste for CCS Wells: Chemical and Mechanical Resistance of Cement Formulations for CO2 Geological Storage Sites," International Journal of Greenhouse Gas Control, 109 (2021).

Qiao, et al., "The Feasibility of Basalt Rock Powder and Superfine Sand as Partial Replacement Materials for Portland Cement and Artificial Sand in Cement Mortar," Research and Application of Materials Science, 1:1 (2019).

Tangchirapat et al., "Use Of Ground Palm Oil Fuel Ash to Improve Strength, Sulfate Resistance, And Water Permeability of Concrete Containing High Amount Of Recycled Concrete Aggregates", Materials & Design, vol. 41, 2012, p. 150-157.

Trejo, et al., "Sustainable development using controlled low-strength material," International Workshop on Sustainable Development and Concrete Technology, Jan. 2004, pp. 231-250.

Zhang et al., "Rapid-Hardening Controlled Low Strength Materials Made of Recycled Fine Aggregate from Construction and Demolition Waste", Construction and Building Materials, vol. 173, 2018, pp. 81-89.

Al-Malack, et al., Characteristics of Fly Ash Produced at Power and Water Desalination Plants Firing Fuel Oil, Int. J. Envir. Res., v. 7(2), Spring 2013, pp. 455-466.

Do, et al., Development of a New Cementless Binder for Controlled Low Strength Material (CLSM) Using Entirely By-products, Construction and Building Materials 206 (2019), pp. 576-589.

Folliard, et al., Development of a Recommended Practice for Use of Controlled Low-Strength Material in Highway Construction (2008), National Academies Sciences Engineering Medicine, NCHRP Report 597, 151 pgs.

Katz, et al., Properties of Concrete Made with Recycled Aggregates from Partially Hydrated Old Concrete, Cement and Concrete Research, vol. 33, No. 5, pp. 703-711, May 2003.

Katz, et al., Utilization of Industrial By-Products for the Production of Controlled Low-Strength Materials, Waste Management (Oxford) 2004: 24:501-512.

\* cited by examiner

RECYCLED CONCRETE WASTE POWDER AND AGGREGATES WITH HEAVY OIL FUEL ASH FOR PRODUCING A GREEN FLOWABLE BACKFILL MATERIAL

RELATED APPLICATIONS

This application is a continuation-in-part application of U.S. Non-Provisional patent application Ser. No. 16/815,805 filed on Mar. 11, 2020, now U.S. Pat. No. 11,434,168 issued Sep. 6, 2022. For purposes of United States patent practice, this application incorporates the contents of the Non-Provisional Application by reference in its entirety.

FIELD

This disclosure relates to a controlled low strength material (CLSM) and methods of production and use. More specifically, this disclosure relates to utilizing heavy oil fuel ash (HOFA) and recycled concrete powder (RCP) waste with natural and recycled aggregates and water as ingredients in CLSM.

BACKGROUND

Controlled low strength material (CLSM) is a self-compacted, cementitious material used primarily as backfill and often as an alternative to compacted fill. CLSM is a slurry including fine aggregate, water, and cementitious material. The qualities that make controlled low strength material a desirable engineered material are the ability to self-consolidate or self-compact in a fresh state and the ability to be excavated after hardening. CLSM can be placed in confined spaces, irregular excavations, or hard to reach places such as beneath undercuts of existing slabs. CLSM is considered a cost effect, labor- and time-saving alternative for compacted fills. CLSM has the benefits of ease of mixing and ease of placement, rapid curing, incompressibility after curing, and reduction of equipment needs, labor costs, and inspections. It also hardens within a few hours without the need of compaction or processing in layers.

Although controlled low strength material can be designed and produced in a similar way to concrete, there are substantial differences between controlled low strength material and concrete. Concrete is designed to resist large stresses in compression and can have a compressive strength in a range of 14 MPa to 50 MPa. Typically, the durability of concrete is affected by the ability to protect the reinforcing steel from corrosion. Therefore it is desirable for concrete to have high density and low permeability. On the other hand, controlled low strength material is mainly used as a substitute for a strong soil and the ability to later excavate the controlled low strength material is an important parameter. Therefore the compressive strength of the material should not typically exceed 300 KPa to 2.1 MPa. Also because there it is no reinforcement of any type in controlled low strength material, the permeability of controlled low strength material is not a critical feature of the controlled low strength material.

Two categories of CLSM exist: excavatable and non-excavatable. Excavatable CLSM can be excavated at a later date with ease by widely used excavation methods (such as heavy equipment like backhoes). Non-excavatable CLSM is not intended to harden such that it is not easily excavated, and requires additional equipment to excavate (such as jackhammers). To be considered a CLSM, once cured, the mix must not have an unconfined compressive strength exceeding 8.3 MPA (1200 psi). However, excavatable CLSM generally has an unconfined compressive strength that does not exceed 2.1 MPa (300 psi).

Heavy oil fuel ash (HOFA) is a byproduct generated by the burning of heavy oil for power generation and desalination plants. At conventional rates of generation, 1000 liters of heavy oil generally produces about 3 kg of HOFA.

Concrete waste is a major component of construction and demolition wastes (CDW). CDW accounts for half of the total solid waste generated worldwide. Concrete waste is conventionally recycled through processes that generate engineered products such as riprap and aggregate bases for road construction or new concrete. Although the concrete itself is recyclable, the concrete powder generated from concrete crushing is currently underutilized.

Therefore, methods for utilizing additional materials for use in generating quality CLSMs are needed. Additionally, methods of using recycled concrete powder and HOFA while still generating quality CLSM materials are needed.

SUMMARY

Embodiments of this disclosure provide for a controlled low strength material (CLSM) generated with heavy oil fly ash (HOFA) and recycled concrete powder. The HOFA and recycled concrete powder are combined with other cementitious materials, aggregates, and water to produce the CLSM. The CLSM can also include natural and recycled aggregates, including recycled concrete aggregates.

Disclosed is a controlled low strength material (CLSM). The CLSM includes an aggregate, a water, and cementitious materials. The cementitious materials include heavy oil fly ash (HOFA) and recycled concrete powder. The recycled concrete powder includes particles less than 0.075 mm. In some embodiments, the cementitious materials further include ordinary Portland cement. The CLSM has a 28 day compressive strength of less than or equal to 8.3 MPa. In some embodiments, the CLSM has a 28 day compressive strength of less than or equal to 2.1 MPa.

In some embodiments, the recycled concrete powder is derived from the processing of concrete waste into smaller concrete fragments. In some embodiments, the aggregate is a natural aggregate. In other embodiments, the aggregate is derived from a recycled concrete. The aggregate is a coarse aggregate derived from the recycled concrete. The aggregate is a fine aggregate derived from the recycled concrete.

In some embodiments, the CLSM has a composition where the weight of the cementitious materials are in the range of 2 wt % to 25 wt % of the CLSM weight; the recycled concrete powder is in the range of 60 wt % to 90 wt % of the cementitious materials weight; the HOFA is in the range of 10 wt % to 30 wt % of the cementitious materials weight; the water is in the range of 10 wt % to 20 wt % of the CLSM weight; and the aggregate is in the range of 40 wt % to 90 wt % of the CLSM weight. In some embodiments, the cementitious materials further include ordinary Portland cement, and the ordinary Portland cement is in the range of 0 wt % to 30 wt % of the cementitious materials weight.

Also disclosed is a method for forming a controlled low strength material (CLSM). The method includes the step of mixing together constituent materials. The constituent materials include an aggregate, a water, and cementitious materials. The cementitious materials include heavy oil fly ash (HOFA) and recycled concrete powder. The recycled concrete powder includes particles less than 0.075 mm. In some embodiments, the cementitious materials further include ordinary Portland cement. The CLSM has a 28 day compressive strength of less than or equal to 8.3 MPa. In some embodiments, the CLSM has a 28 day compressive strength of less than or equal to 2.1 MPa.

In some embodiments, the recycled concrete powder is derived from the processing of concrete waste into smaller concrete fragments. In some embodiments, the aggregate is a natural aggregate. In other embodiments, the aggregate is derived from a recycled concrete. In some embodiments, the CLSM has a composition where the weight of the cementitious materials are in the range of 2 wt % to 25 wt % of the CLSM weight; the recycled concrete powder is in the range of 60 wt % to 90 wt % of the cementitious materials weight; the HOFA is in the range of 10 wt % to 30 wt % of the cementitious materials weight; the water is in the range of 10 wt % to 20 wt % of the CLSM weight; and the aggregate is in the range of 40 wt % to 90 wt % of the CLSM weight. In some embodiments, the cementitious materials further include ordinary Portland cement, and the ordinary Portland cement is in the range of 0 wt % to 30 wt % of the cementitious materials weight.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the scope as it can admit to other equally effective embodiments.

DETAILED DESCRIPTION

Figure 1:
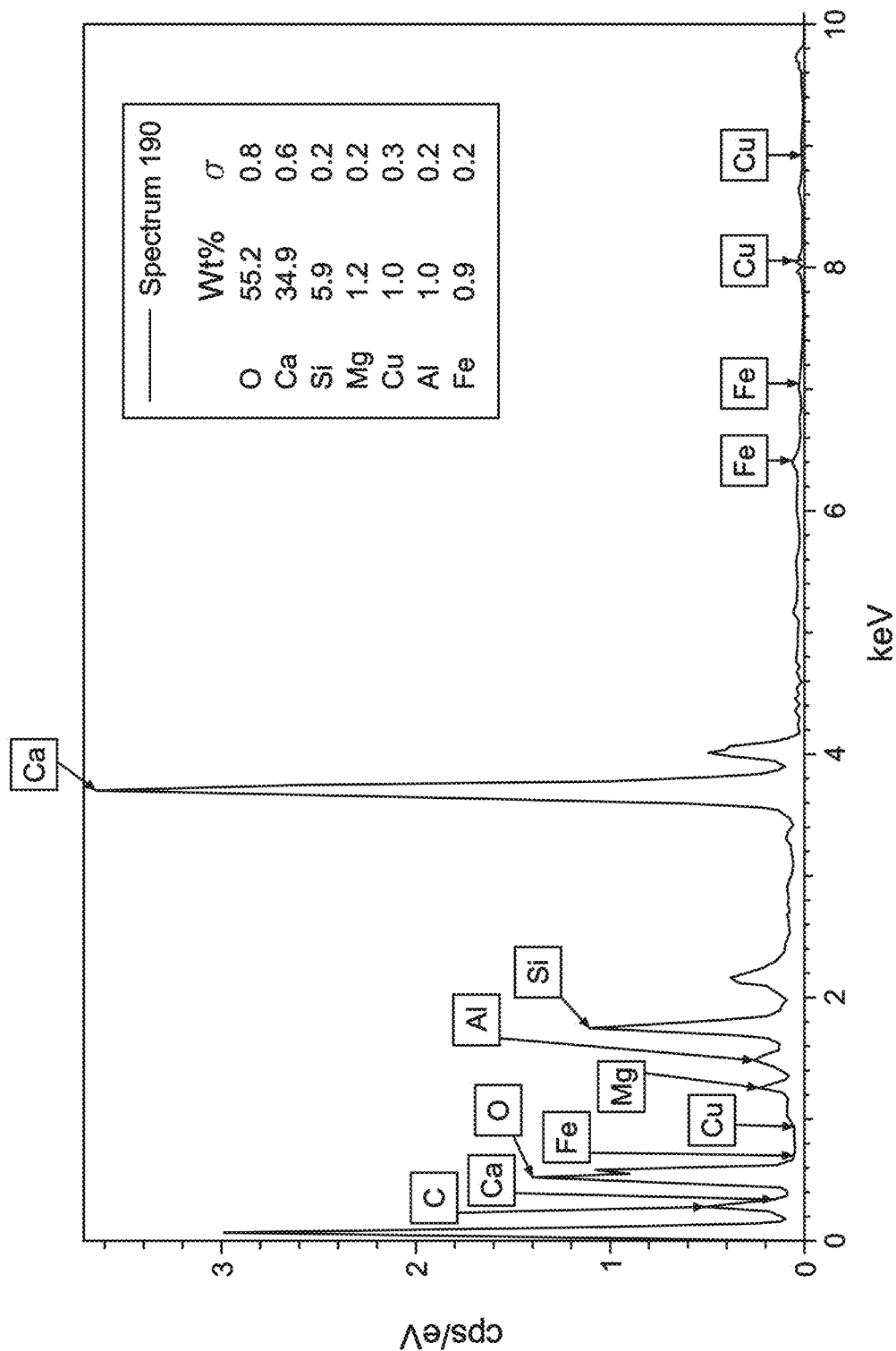
FIG. 1 is an EDS result chart for recycled concrete powder.

While the disclosure will be described with several embodiments, it is understood that one of ordinary skill in the relevant art will appreciate that many examples, variations and alterations to the systems and methods described are within the scope and spirit of the disclosure. Accordingly, the embodiments of the disclosure described are set forth without any loss of generality, and without imposing limitations, on the claims.

The terms "comprising," "including," "having," and the like, as used with respect to embodiments of the present disclosure, are synonymous and are each intended to have an open, non-limiting meaning that does not exclude additional elements or steps. In this disclosure and the appended claims, the terms "about" and "approximately" can include a deviation of ±5% of the given value unless the deviation changes the nature or effect of the value such that it is not operable to achieve its intended purpose. The terms "optional" or "optionally" mean that an element can be used for some embodiments, but can be omitted in other embodiments. The singular forms "a," "an," and "the" include plural referents, unless the context clearly dictates otherwise.

Where reference is made in the specification and appended claims to a method comprising two or more defined steps, the defined steps can be carried out in any order or simultaneously except where the context excludes that possibility.

Advantageously, the CLSM provided herein utilizes recycled and waste products, including recycled concrete powder and HOFA, which generates a more environmentally friendly CLSM as it utilizes wastes that would otherwise be discarded. In some embodiments, the CLSM also utilizes less ordinary Portland cement (OPC) than other conventional CLSM mixtures, thus further reducing the environmental impact of the material. In some embodiments, the use of OPC in the CLSM can be eliminated completely. Additionally, recycled concrete powder is generally inexpensive and widely available in portions of the world where concrete wastes are crushed. Recycled concrete powder and HOFA can be utilized in areas where conventional fly ash is not widely available, or where conventional fly ash production is diminishing. HOFA is generally available in areas where oil and gas are the primary electricity generating fuels (in lieu of coal), thus HOFA is generally available in large quantities where conventional fly ash production is more limited. Also, the CLSM of the present invention does not utilize conventional fly ash generated from coal combustion, which in some parts of the world may be banned due to the negative environmental impact associated with the fly ash material. The CLSM can also utilize recycled concrete aggregate, thus utilizing an entire waste stream. In some embodiments, the CLSM is made of 100% by-products or waste, with the exception of water. Not be bound by theory, but it is believed that the available unreacted cement particles in the recycled concrete powder can react to produce a binding gel in addition to having a filler effect. Additionally, HOFA can enhance the particle packing effect, which can improve the fresh and hardened properties of the resulting CLSM. Thus, the combination of the recycled concrete powder and the HOFA in the embodiments disclosed herein unexpectedly and surprisingly produces superior CLSM.

To be considered a CLSM, once cured, the mix must not have an unconfined compressive strength exceeding 8.3 MPA (1200 psi). However, excavatable CLSM generally has an unconfined compressive strength that does not exceed 2.1 MPa (300 psi). Additionally, CLSM must have a flow spread diameter of more than 200 mm to be classified as a CLSM. Additionally, CLSM must generally have a hardening time of less than or equal to 12 hours, a bleeding rate of less than or equal to about 5%, and a segregation rate of less than or equal to about 15%.

Compositions, methods of generation, and methods of use are provided herein for a CLSM made with HOFA and recycled concrete powder to generate a more environmentally friendly flowable backfill material. Natural and recycled aggregates can also be utilized in the CLSM, including recycled concrete aggregates. The CLSM is formed that includes cementitious material, aggregates, a HOFA, and recycled concrete powder. Each of the constituents are further described in this disclosure.

Cementitious Material

A material that is a paste that can harden to bind materials together is said to be a cementitious material or to have cementitious properties. Cement is a commonly used cementitious material. An example of a type of cement is ordinary Portland cement (OPC). OPC is an example of a binder that can bind to other materials, such as aggregates, thereby holding them together. OPC can be, for example, a Type I Portland Cement as classified by the American Society for Testing and Materials (ASTM) such as in ASTM C150. Any type of cement, including a pozzolanic cement, can be used to produce the CLSM of this disclosure. Examples of possible cements include Type I or Type V cements per ASTM standards.

Recycled Concrete Powder

In embodiments of this disclosure, the cementitious material includes a recycled concrete powder. The recycled concrete powder can be generated from concrete demolition waste that has been crushed into smaller pieces including sand-sized and aggregate-sized pieces. Crushing can be done by any method known in the art, such as using a jack hammer or other demolition equipment. Further crushing or grinding can be performed using grinders, such as disc grinders. As an example, in order to form the recycled concrete powder, concrete fragments from the demolition of structures can be crushed then sieved into aggregate size pieces, and further ground into powders. In some embodiments, a #200 sieve is utilized to obtain recycled concrete powder material finer than 75 μm.

The aggregate sized pieces can be in a range, for example, of 0.5 mm to 37.5 mm. The remaining material from this process can have a particle size of less than 0.5 mm and can contain fines and cement. This remaining material can be used for binding and cementing the other ingredients of the controlled low strength material. The recycled concrete powder consists primarily of particles less than about 0.075 mm. The recycled concrete powder is generally free of deleterious materials and other contaminants.

In embodiments of the CLSM, all or part of the cementitious material for the controlled low strength material can be a recycled cement. Not to be limited by theory, but it is believed that the recycled concrete powder contains unreacted grains of cement which may react with water to produce a binding effect in the CLSM. In some embodiments, the amount of OPC in the CLSM can be reduced by 50% or more when using recycled concrete powder. In some embodiments, no OPC is utilized in the CLSM.

Figure 2:
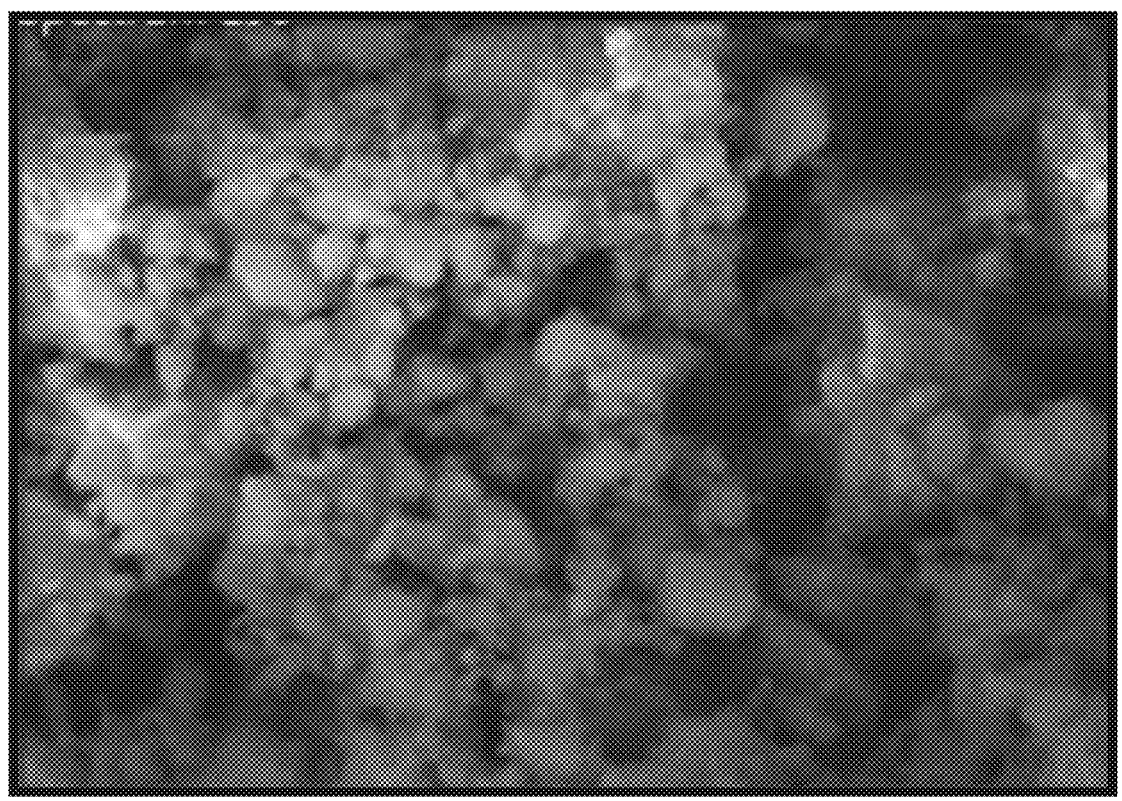
FIG. 2 is a photograph of recycled concrete powder from a scanning electron microscope.

The recycled concrete powder consists of primarily calcite and quartz. FIG. 1 shows the resulting chart of an energy-dispersive X-ray spectroscopy (EDS) analysis performed on a sample of recycled concrete powder. Recycled concrete powder features an irregular morphology, as shown in the scanning electron microscope image in FIG. 2.

Heavy Oil Fly Ash (HOFA)

Heavy oil fly ash (HOFA) is a residue resulting from the combustion of heavy oil or cracked oil in power generating plants or similar combustion chambers. Heavy oil is generally defined as fuel oil having relatively long hydrocarbon chains such as, for example, carbon lengths of between about 12-70 carbon atoms or between about 20-70 carbon atoms. Due to its high viscosity, heavy fuel oil is sometimes preheated before combustion in, for example, a power generation plant.

Cracking, in the oil refining industry, generally refers to breaking down complex organic molecules into simpler molecules by breaking the long-chain hydrocarbons into shorter hydrocarbon chains. Various processes can be used to crack oil including, for example, catalytic processes. After the cracking process, the resultant hydrocarbons can be separated into various types of fuel, including, for example, fuel gas, liquefied petroleum gas, gasoline, light cycle oils, and heavy fuel oil. The heavy fuel oil produced by the cracking process can be referred to as "cracked fuel oil." For purposes of this application, cracked fuel oil and heavy fuel oil are both referred to as a heavy oil, unless otherwise specified. Electricity production plants and water desalination plants can use heavy oil. An increase in the resulting heavy oil ash is expected due to additional environmental restrictions. Combustion of heavy oil produces residue, including HOFA. The HOFA can, and to some extent must, due to environmental restrictions, be captured rather than being released into the atmosphere.

HOFA is a black powder type of waste material that results from burning of heavy oil and has unique characteristics compared to other types of ash. HOFA is collected in the electrostatic precipitators, which are installed on boilers burning residual oil, for air pollution control. A current practice for the disposal of HOFA is to bury the HOFA in special lined and sealed pits which is very costly and requires large area to be reserved as dumping sites.

HOFA can include various particle sizes. In an embodiment of this disclosure, no more than 20% by weight of the HOFA is retained on a #325 sieve, while at least 80% by weight of the material passes through the #325 sieve. This indicates that at least 80% by weight of the HOFA can be finer than about 45 micrometers (microns).

Typically, HOFA includes more than about 90% by weight carbon. The remaining less than about 10% by weight of the HOFA can contain various elements. For example, Table 1 presents an example chemical analysis of a HOFA. The amounts of each element can vary depending upon the source of the HOFA.

TABLE 1

Elemental Composition of Example Embodiment of Heavy Oil Fly Ash

| Element | Weight % (Range) |
| --- | --- |
| Carbon | 90-95 |
| Magnesium | 0.50-1.00 |
| Silicon | 0.05-0.10 |
| Sulfur | 5-6 |
| Vanadium | 0.5-1.0 |

In embodiments of this disclosure, the HOFA can include carbon in an amount of 90 wt % to 95 wt % based on the weight of HOFA.

Table 2 presents an example compound composition and other characteristics of heavy oil fly ash. The amounts of each compound can vary depending upon the source of the heavy oil fly ash.

TABLE 2

Compound Composition and Characteristics of
Example Embodiment of Heavy Oil Fly Ash

| Parameter | Weight % (Range of Values) |
|---|---|
| $SiO_2$ | 1-2 |
| CaO | 0.4-1.0 |
| $Al_2O_3$ | <0.10 |
| $Fe_2O_3$ | 0.4-0.5 |
| MgO | 0.4-0.6 |
| $K_2O$ | 0.01-0.04 |
| $Na_2O$ | 0.5-1.0 |
| $V_2O5$ | 2.0-3.0 |
| Sulfur | 5-10 |
| $Na_2O + (0.658K_2O)$, % | 0.3-0.6 |
| Loss on ignition | 55-65 |
| Moisture % | 5-10 |
| Fineness (Material retained on # 325 sieve) | 80-90 |

The elemental and compound composition of the HOFA used in embodiments of the present disclosure is substantially different from that of conventional fly ash.

Unlike HOFA, conventional fly ash is generally produced by burning coal. The main chemical components of the conventional fly ash are silicon dioxide ($SiO_2$), calcium oxide (CaO), aluminum oxide ($Al_2O_3$), and iron oxide ($Fe_2O_3$) and is in accordance with ASTM C618. Conventional fly ash is generally categorized depending on the type of coal burned. For example, class F fly ash is produced by burning anthracite and bituminous coal, while Class C fly ash is produced by burning lignite or sub-bituminous coal. Since traditional fly ash contains substantial amounts of silica, traditional fly ash reacts with calcium hydroxide, or lime, during the hydration of cement, making the cement dense and impermeable. As an example, a coal ash can contain 46.6 wt % CaO, 33.8 wt % $SiO_2$ and 14.8 wt % $SO_4$, based on the weight of traditional coal ash. With such amounts of CaO, $SiO_2$, and $SO_4$ there is only 4.8 wt % of any other compound in the traditional coal ash. Therefore such conventional coal ash could not contain at least 90 wt % carbon.

Embodiments of this disclosure are free of conventional fly ash from coal combustion. Because HOFA ash contains at least 90 wt % carbon, HOFA does not contribute to the formation of supplementary cement and is traditionally considered essentially non-cementitious. In embodiments of the present disclosure, the HOFA replaces a portion of the cementitious material.

Aggregate

As one of ordinary skill will appreciate, various types of conventional aggregates can be used as a filler. Fine aggregates used in embodiments of this disclosure, also referred to as "fines," can include natural sand, crushed stone, soil, or other suitable fine particles, with most particles smaller than 4.75 mm. Coarse aggregates generally include gravel or crushed stone with particles predominantly larger than 5 mm and typically between 9.5 mm and 37.5 mm. In some embodiments of this disclosure, the aggregate consists entirely of a recycled product. As an example, the concrete fragments can be derived from demolished structures. In some embodiments, the coarse aggregate includes recycled concrete aggregate. In some embodiments, the fine aggregate includes recycled concrete aggregate. The recycled concrete aggregate can be generated from crushing concrete waste and segregating the resulting particles by size. The recycled concrete will have greater porosity and less density and have a greater water demand than a new cement product. In some embodiments, natural aggregates are used. Natural aggregates can include sand and crushed rock. In some embodiments of this disclosure, the aggregate can include washed concrete sand, dune sand, or marl soil.

A maximum particle size of the aggregate used in embodiments of this disclosure can be as large as 19 mm, however, the portion of aggregates larger than 9.5 mm should be 10 wt % or less, based on the weight of the aggregate. In alternate embodiments of this disclosure, the aggregate consists essentially of a fine aggregate and has a particle size of less than 4.75 mm.

Including a coarse aggregate in the controlled low strength material can increase the strength of the controlled low strength material. Therefore by not including any coarse aggregate, the strength of the controlled low strength material can be maintained sufficiently low to allow for later excavation of the set controlled low strength material. In addition, plastic properties of the controlled low strength material in a fresh state, such as water demand and flowability, will be altered by including only fine aggregate, compared to a controlled low strength material that includes a coarse aggregate in addition to a fine aggregate. The water demand may increase in order to achieve a flowable controlled low strength material.

Water

Water can be added to dry cement to make cement paste. The water-cement ratio ("w/c ratio") of a typical Portland cement can be between about 0.20 and 0.50. By way of explanation, a w/c ratio of 0.20 indicates that there is one part water to five parts Portland cement (⅕=0.20). A w/c ratio of 0.50 indicates one part water to two parts cement. Embodiments of this disclosure include a w/c ratio in a range of 2.0 and 7.5. The ratio of water and fine cementitious material will balance the strength and flowablility of the resulting controlled low strength material.

The water used for forming the controlled low strength material can be fresh and free of oil and other contaminants, with foreign particles not exceeding the limits established for concrete mixing.

Controlled Low Strength Material (CLSM)

The CLSM disclosed herein is prepared by mixing the constituent materials, which include cementitious materials, water, and aggregate. The cementitious materials can include HFOA, cement, and recycled concrete powder. The cement can include OPC. In some embodiments, the cementitious material is only comprised of HFOA and recycled concrete powder, in the absence of cement. The CLSM has the constituent composition shown in Table 3:

TABLE 3

Composition of CLSM

| Material | Content Range | Range Basis |
|---|---|---|
| Cementitious Material | 2 wt % to 25 wt % | Total CLSM weight |
| Cement | 0 wt % to 30 wt % | Cementitious material weight |
| Recycled Concrete Powder | 60 wt % to 90 wt % | Cementitious material weight |
| HOFA | 10 wt % to 30 wt % | Cementitious material weight |
| Water | 10 wt % to 20 wt % | Total CLSM weight |
| Aggregate | 40 wt % to 90 wt % | Total CLSM weight |
| Coarse Aggregate | 30 wt % to 50 wt % | Total CLSM weight |
| Fine Aggregate | 50 wt % to 70 wt % | Total CLSM weight |

In Table 3, some of the constituents are relative to the total CLSM weight, and some are relative to a constituent weight. For example, if the cementitious material is 10 wt % of the total CLSM weight, and the HOFA is 10 wt % of the cementitious material, then the HOFA is 1% of the total CLSM weight.

The aggregate can be recycled concrete aggregate. The CLSM can include coarse recycled concrete aggregate, fine recycled concrete aggregate, or both. The remaining aggregate can be natural aggregate or another type of aggregate. In some embodiments, no coarse aggregate is utilized.

In certain embodiments, the controlled low strength material can be free of traditional fly ash, plasticizers, and fiber. In alternate embodiments, the controlled low strength material can include a plasticizer or entrained air admixtures to achieve the desired consistency.

In some embodiments, the CLSM has a 28 day compressive strength in a range of 300 kPa to 2.1 MPa. In some embodiments, the CLSM has a 28 day compressive strength in a range of 350 kPa to 800 kPa. In some embodiments, the CLSM has a 28 day compressive strength of equal to or less than 8.3 MPa. In some embodiments, the CLSM has a 28 day compressive strength of equal to or less than 2.1 MPa.

The controlled low strength material formed in accordance with embodiments of this disclosure can be self-consolidating or flowable fill. When tested in accordance with ASTM D6103 Test Method for Flow Consistency of Controlled Low Strength Material, an open-ended cylinder is placed on a flat, level surface and filled with fresh controlled low strength material. The cylinder is then raised quickly so that the controlled low strength material will flow into a patty. The average diameter of the patty is measured. When tested in accordance with ASTM D6103 Test Method for Flow Consistency of Controlled Low Strength Material, the controlled low strength material of embodiments of this disclosure can provide a patty with an average diameter between 200 mm and 250 mm without any segregation. The consistency can be altered by adding plasticizer or entrained air.

The CLSM can have a mix proportion developed to obtain a desired consistency or mechanical property. The testing to the CLSM to show compliance with the desire properties can follow Table 4:

TABLE 4

Test Methods

| Property | Specimen Size and Geometry | Testing Age | Test Method |
| --- | --- | --- | --- |
| Flow | 750 × 150 mm cylinder | Fresh Property | ASTM C6103 |
| Bleeding | 2000 × 300 mm height steel container | Fresh Property | ASTM C232 |
| Setting Time | 150 mm cube | Fresh Property | ASTM C403 |
| Fresh Density | 50 mm cube | Fresh Property | ASTM C138 |
| Compressive Strength | 50 mm cube | 1, 3, 7, 28, and 90 days | ASTM C39 |
| Split Tensile Strength | 75 × 150 mm cube | 28 and 90 days | ASTM C496 |
| Water Absorption | 75 × 150 mm cube | 28 days | ASTM C642 |
| Drying Shrinkage | 25 × 25 × 285 mm prism | Regular Monitoring | ASTM C157 |
| Sulfate Resistance | 50 mm cubes | Regular Monitoring | ASTM C1012 |

In preferred embodiments, the CLSM has properties according to Table 5:

TABLE 5

| CLSM Properties | |
| --- | --- |
| Property | Suitable Range for CLSM |
| Flowability | 200 mm to 300 mm |
| Bleeding | <5% |
| Segregation | <15% |
| Hardening Time | 12 hours to 36 hours |
| Density of CLSM | 1840 kg/m$^3$ to 2320 kg/m$^3$ |

In order to form the controlled low strength material, the constituents of the controlled low strength material can be batched in stationary concrete batch plants in general conformance with ASTM C94, or mixed in mobile volumetric mixing plants in accordance with ASTM C685. In each case, there may be necessary adjustment or modifications to the plant fixtures or process to allow for introducing the HOFA and recycled concrete powder or recycled concrete aggregates in an accurately-measured amounts.

Experimental Examples

A variety of experimental CLSM mixtures were prepared utilizing recycled concrete powder, some with HOFA. The CLSM mixes featured a variety of HOFA, recycled aggregates, and natural aggregates composition percentages. A limestone aggregate was utilized as a coarse aggregate. Dune sand was utilized as a fine aggregate. Recycled coarse aggregate and recycled fine aggregate was obtained by crushing concrete construction and demolition waste and sieving the crushed product to the appropriate size. The chemical composition of the recycled concrete powder utilized in the experimental CLSM mixtures is shown in Table 6:

TABLE 6

| Chemical Composition of Recycled Concrete Powder | |
| --- | --- |
| Constituent | Weight % |
| $SiO_2$ | 7.59 |
| CaO | 86.10 |
| $SO_3$ | 0.74 |
| $Fe_2O_3$ | 5.10 |
| $K_2O$ | 0.03 |
| $Na_2O$ | 0.53 |

TABLE 6-continued

Chemical Composition of Recycled Concrete Powder

| Constituent | Weight % |
|---|---|
| Loss on Ignition | 65.6 |
| Moisture % | 5.12 |

Mixtures of CLSM with HOFA but no recycled concrete powder were also utilized as comparative samples. The compositions of the experimental CLSM mixtures are shown in Table 7:

TABLE 7

Compositions of Experimental CLSM Mixtures

| Mix # | Mix Label | OPC, kg/m³ | RCP, kg/m³ | HOFA, kg/m³ | W/C | CA, kg/m³ | FA, kg/m³ | RCA, kg/m³ | RFA, kg/m³ |
|---|---|---|---|---|---|---|---|---|---|
| M1 | 30 wt % HOFA & RCA | 70 | — | 30 | 3.3 | — | 1077 | 718 | — |
| M2 | 30 wt % HOFA & RA | 70 | — | 30 | 3.5 | — | — | 703 | 1055 |
| M3 | RCP/NA | 60 | 340 | 0 | 0.70 | 547 | 820 | 0 | 0 |
| M4 | RCP/RA | 60 | 340 | 0 | 0.75 | 0 | 0 | 511 | 766 |
| M5 | RCP & HOFA/NA | 70 | 250 | 80 | 0.82 | 403 | 605 | 0 | 0 |
| M6 | RCP & HOFA/RA | 70 | 250 | 80 | 0.90 | 0 | 0 | 360 | 540 |
| M7 | Low RCP/NA | 50 | 250 | 0 | 0.90 | 590 | 884 | 0 | 0 |
| M8 | Low RCP/RA | 50 | 250 | 0 | 1.00 | 0 | 0 | 557 | 836 |

When referring to the experimental mixtures, RCA stands for recycled coarse aggregate; RA stands for recycled aggregate, which includes both recycled coarse aggregate and recycled fine aggregate; NA stands for natural aggregate, which includes both natural limestone aggregate as coarse aggregate and natural dune sand as fine aggregate; and RCP stands for recycled concrete powder.

Figure 3:
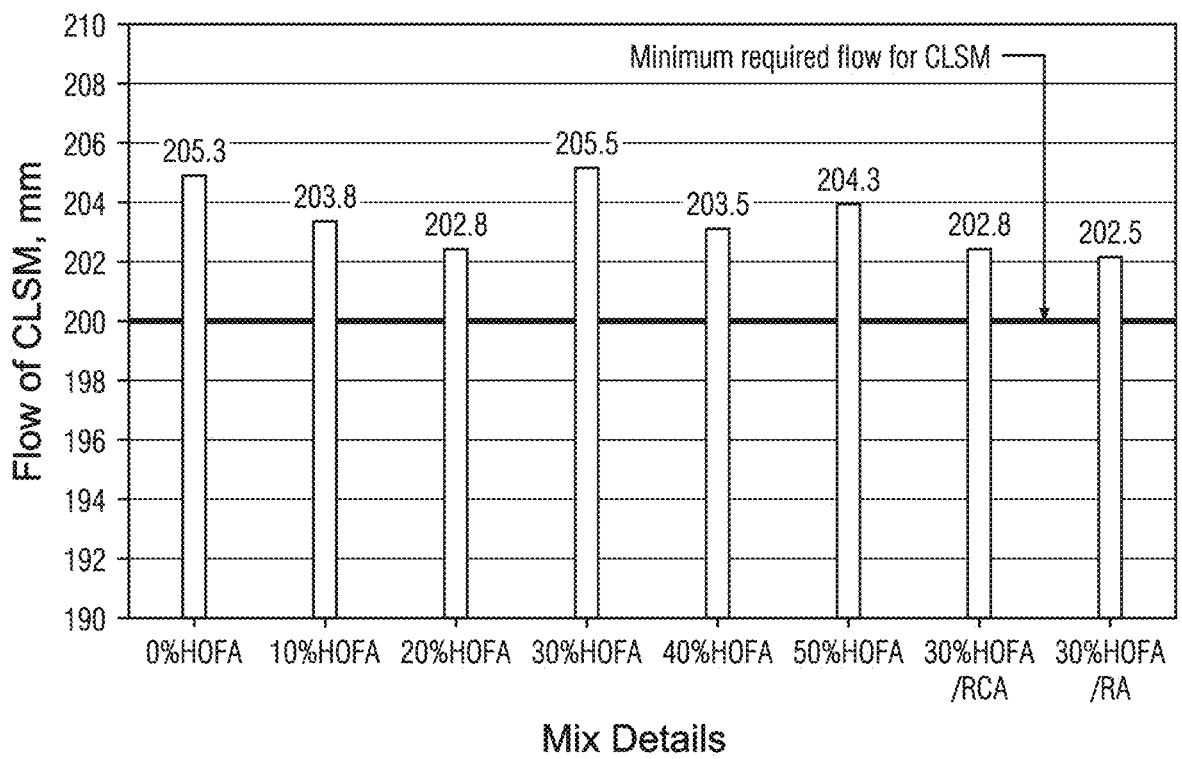
FIG. 3 is a chart of the flow results of CLSM mixtures incorporating HOFA.

Referring to FIG. 3, flow measurements in mm for various mixtures of CLSM containing increasing amounts of HOFA are shown. The flow was measured in accordance with ASTM C6103. The minimum required flow for a CLSM is 200 mm, which is marked on FIGS. 3 and 4 with a horizontal line. From left to right, the mixtures are 1) CLSM with 0 wt % HOFA; 2) CLSM with 10 wt % HOFA; 3) CLSM with 20 wt % HOFA; 4) CLSM with 30 wt % HOFA; 5) CLSM with 40 wt % HOFA; 6) CLSM with 50 wt % HOFA; 7) CLSM with 30 wt % HOFA and recycled concrete aggregate; and 8) CLSM with 30 wt % HOFA and recycled aggregate.

Figure 4:
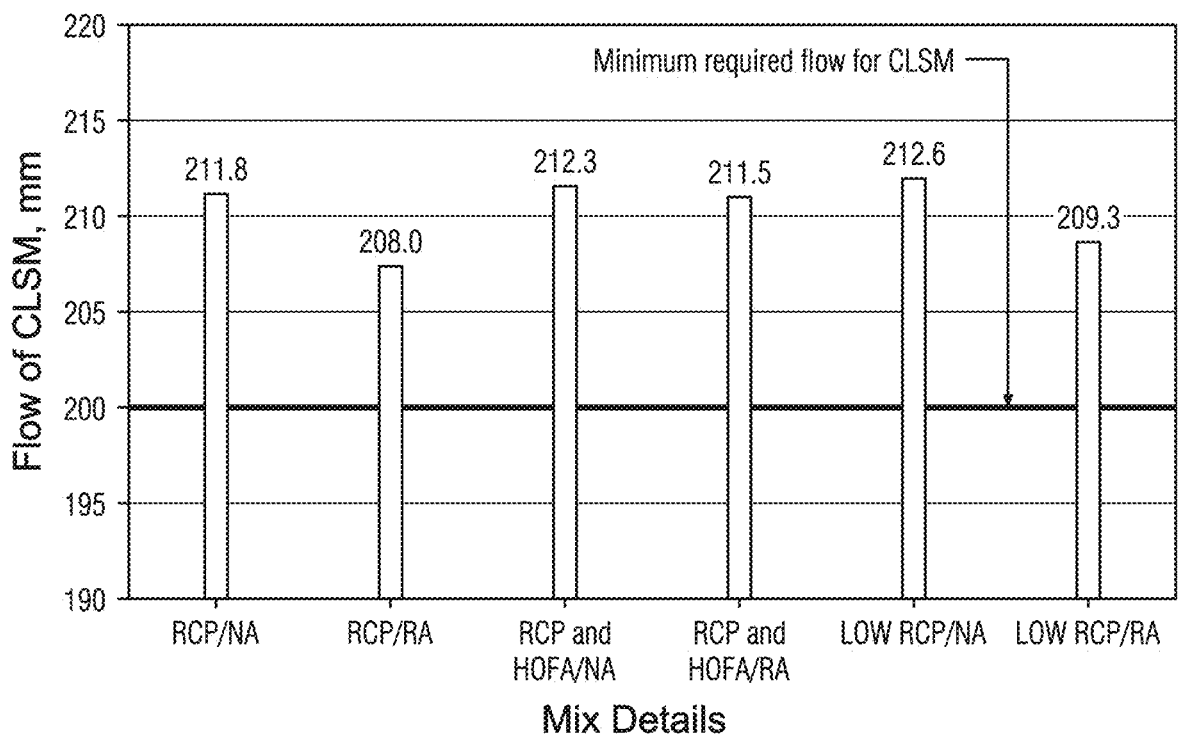
FIG. 4 is a chart of the flow results of CLSM mixtures incorporating HOFA and recycled concrete powder.

Referring to FIG. 4, flow measurements in mm for various mixtures of CLSM containing various amounts of recycled concrete powder (abbreviated RCP on the chart) are shown. The flow was measured in accordance with ASTM C6103. From left to right, the mixtures are 1) CLSM with recycled concrete powder with natural aggregates; 2) CLSM with recycled concrete powder with recycled aggregates; 3) CLSM with recycled concrete powder and HOFA with natural aggregates; 4) CLSM with recycled concrete powder and HOFA with recycled aggregates (both coarse and fine aggregates); 5) CLSM with low levels of recycled concrete powder with natural aggregates; and 6) CLSM with low levels of recycled concrete powder with recycled aggregates (both coarse and fine aggregates).

Beneficially, the use of the recycled concrete powder surprisingly increased the flow as compared to the HOFA samples. Higher flow is beneficial for CLSM as it allows for self-leveling and filling irregular voids. The use of recycled aggregate decreased the flow.

Figure 5:
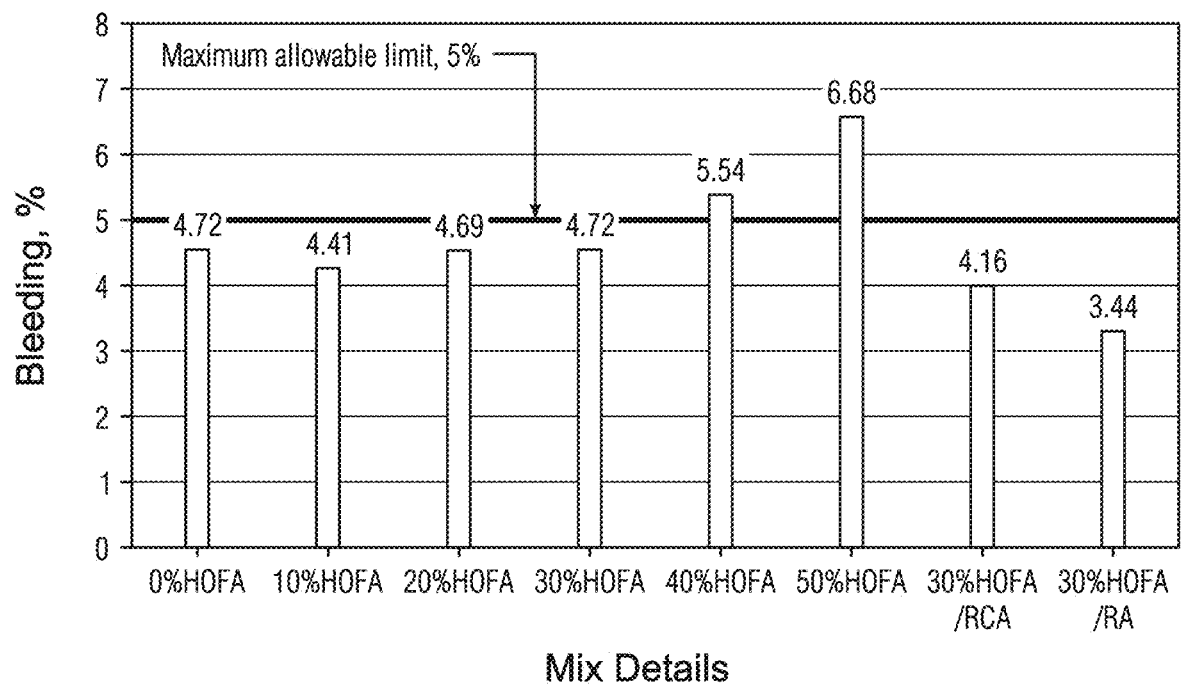
FIG. 5 is a chart of the bleeding results of CLSM mixtures incorporating HOFA.

Referring to FIG. 5, bleeding measurements in percentages for various mixtures of CLSM containing increasing amounts of HOFA are shown. The bleeding was measured in accordance with ASTM C232. The maximum allowable bleeding for a CLSM is about 5%, which is marked on FIGS. 5 and 6 with a horizontal line. From left to right, the mixtures are 1) CLSM with 0 wt % HOFA; 2) CLSM with 10 wt % HOFA; 3) CLSM with 20 wt % HOFA; 4) CLSM with 30 wt % HOFA; 5) CLSM with 40 wt % HOFA; 6) CLSM with 50 wt % HOFA; 7) CLSM with 30 wt % HOFA and recycled concrete aggregate; and 8) CLSM with 30 wt % HOFA and recycled aggregate.

Figure 6:
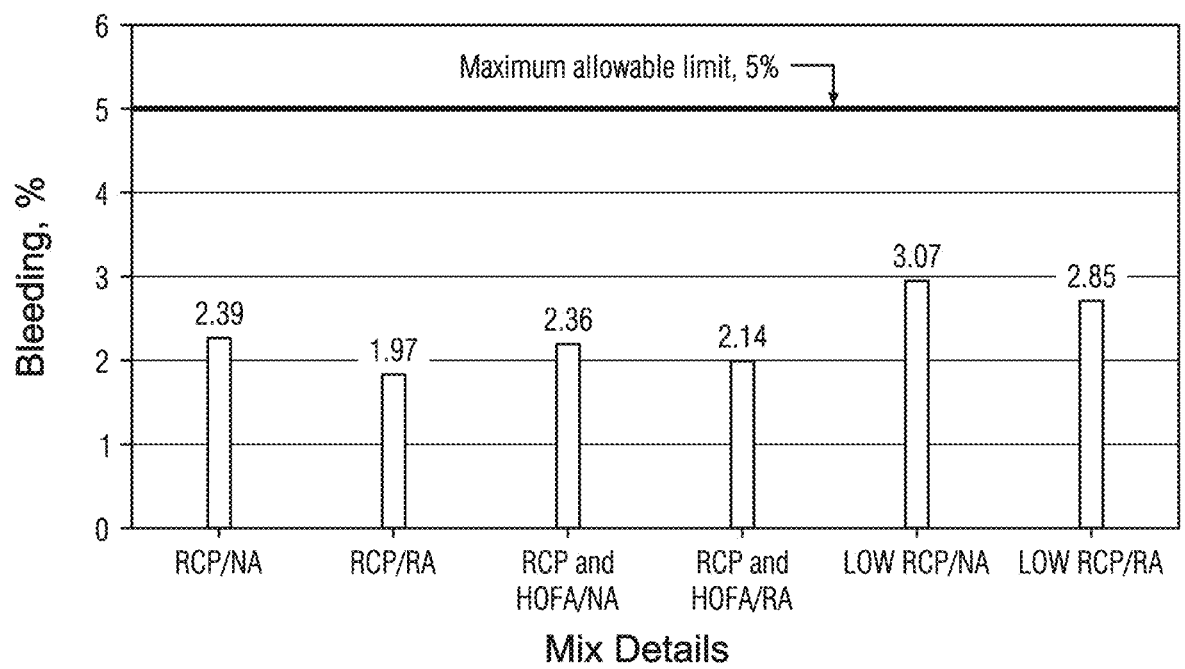
FIG. 6 is a chart of the bleeding results of CLSM mixtures incorporating HOFA and recycled concrete powder.

Referring to FIG. 6, bleeding measurements in percentages for various mixtures of CLSM containing various amounts of recycled concrete powder (abbreviated RCP on the chart) are shown. The flow was measured in accordance with ASTM C6103. From left to right, the mixtures are 1) CLSM with recycled concrete powder with natural aggregates; 2) CLSM with recycled concrete powder with recycled aggregates; 3) CLSM with recycled concrete powder and HOFA with natural aggregates; 4) CLSM with recycled concrete powder and HOFA with recycled aggregates; 5) CLSM with low levels of recycled concrete powder with natural aggregates; and 6) CLSM with low levels of recycled concrete powder with recycled aggregates.

Beneficially and advantageously, all of the mixtures featuring recycled concrete powder were well below the maximum allowable limit of 5% for bleeding. A lower bleeding rate is advantageous as it decreases the hardening time and reduces shrinkage.

The setting time of various CLSM mixes produced with HOFA are showing in Table 8. The setting time was measured in accordance with ASTM C403. RCA means recycled coarse aggregate and RFA means recycled fine aggregate.

TABLE 8

Setting Time of CLSM Mixes Produced with HOFA

| Mix # | Mix Details | Sample 1 Initial Set, h: min | Sample 2 Initial Set, h: min | Average Initial Setting, h: min |
|---|---|---|---|---|
| M10 | 0 wt % HOFA | 8 h 28 min | 8 h 55 min | 8 h 41 min |
| M11 | 10 wt % HOFA | 9 h 8 min | 9 h 36 min | 9 h 22 min |
| M12 | 20 wt % HOFA | 9 h 39 min | 9 h 12 min | 9 h 25 min |
| M13 | 30 wt % HOFA | 10 h 55 min | 10 h 9 min | 10 h 32 min |
| M14 | 40 wt % HOFA | 12 h 11 min | 12 h 8 min | 12 h 9 min |
| M15 | 50 wt % HOFA | 15 h 22 min | 15 h 38 min | 15 h 30 min |
| M16 | 30 wt % HOFA and RCA | 9 h 25 min | 9 h 18 min | 9 h 22 min |
| M17 | 30 wt % HOFA. RCA and RFA | 9 h 15 min | 9 h 23 min | 9 h 19 min |

The setting time of various CLSM mixes produced with recycled concrete powder are showing in Table 9. The setting time was measured in accordance with ASTM C403.

TABLE 9

Setting Time of CLSM Mixes Produced with HOFA

| Mix # | Mix Details | Sample 1 Initial Set, h:min | Sample 2 Initial Set, h:min | Average Initial Setting, h:min |
|---|---|---|---|---|
| M18 | OPC + RCP + NA | 8 h 25 min | 8 h 36 min | 8 h 31 min |
| M19 | OPC + RCP + RA | 8 h 5 min | 8 h 12 min | 8 h 8 min |
| M20 | OPC + RCP + HOFA + NA | 9 h 22 min | 9 h 23 min | 9 h 22 min |
| M21 | OPC + RCP + HOFA + RA | 8 h 36 min | 8 h 12 min | 8 h 24 min |
| M22 | Low OPC + RCP + NA | 12 h 36 min | 12 h 56 min | 12 h 46 min |
| M23 | Low OPC + RCP + RA | 12 h 55 min | 13 h 28 min | 12 h 54 min |

Figure 7:
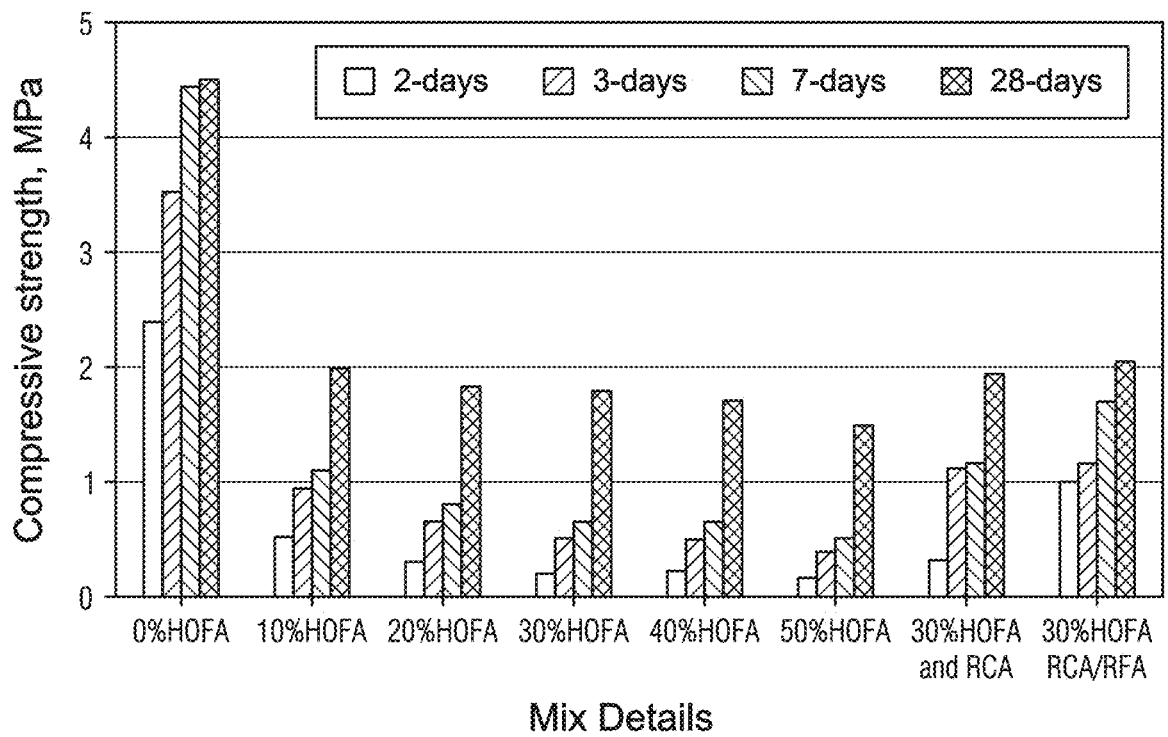
FIG. 7 is a chart of the compressive strength results of CLSM mixtures incorporating HOFA.

Referring to FIG. 7, compressive strength measurements in MPa for various mixtures of CLSM containing increasing amounts of HOFA are shown. The compressive strength was measured in accordance with ASTM C39. The compressive strength was measured at the industry standard four time increments from pouring: 2-day, 3-day, 7-day, and 28-day. The compressive strength measured at each time interval is referred to as the time interval compressive strength. For example, the 28-day compressive strength is the compressive strength measured 28 days from the day of pouring. From left to right, the mixtures are 1) CLSM with 0 wt % HOFA; 2) CLSM with 10 wt % HOFA; 3) CLSM with 20 wt % HOFA; 4) CLSM with 30 wt % HOFA; 5) CLSM with 40 wt % HOFA; 6) CLSM with 50 wt % HOFA; 7) CLSM with 30 wt % HOFA and recycled coarse aggregate; and 8) CLSM with 30 wt % HOFA and recycled fine aggregate.

Figure 8:
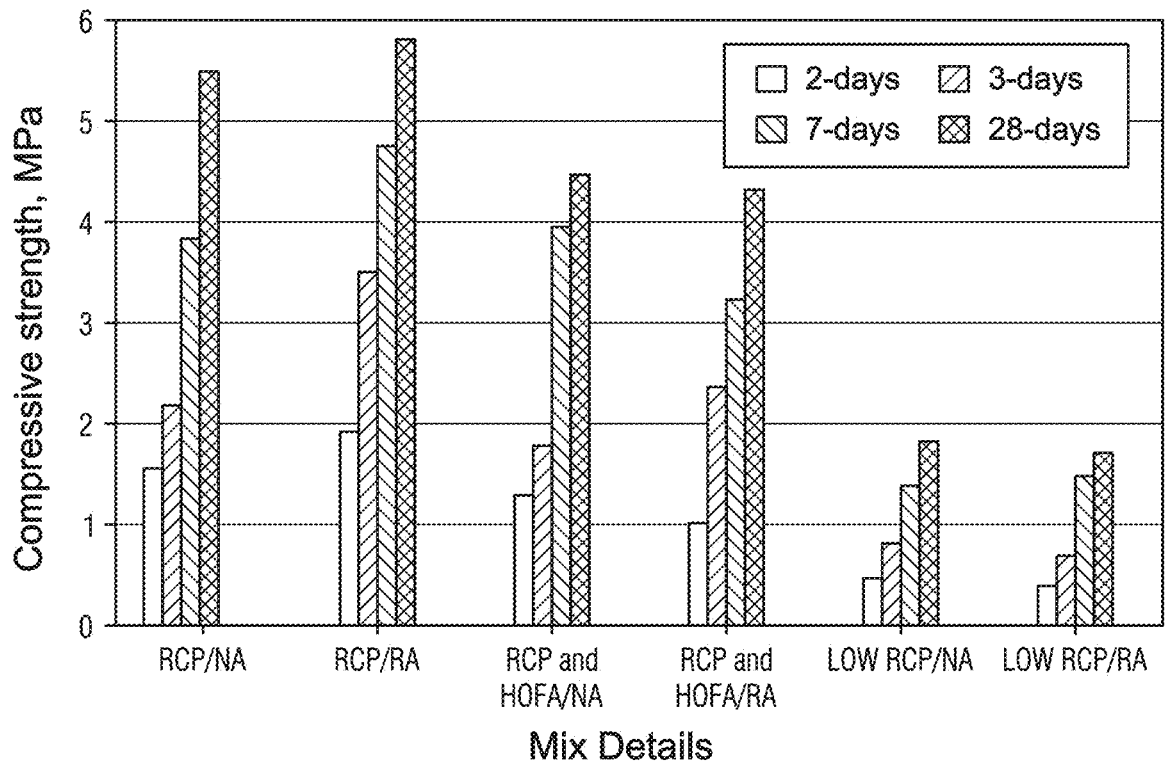
FIG. 8 is a chart of the compressive strength results of CLSM mixtures incorporating HOFA and recycled concrete powder.

Referring to FIG. 8, compressive strength measurements in MPa for various mixtures of CLSM containing various amounts of recycled concrete powder (abbreviated RCP on the chart) are shown. The compressive strength was measured in accordance with ASTM C39. From left to right, the mixtures are 1) CLSM with recycled concrete powder with natural aggregates; 2) CLSM with recycled concrete powder with recycled aggregates; 3) CLSM with recycled concrete powder and HOFA with natural aggregates; 4) CLSM with recycled concrete powder and HOFA with recycled aggregates; 5) CLSM with low levels of recycled concrete powder with natural aggregates; and 6) CLSM with low levels of recycled powder with recycled aggregates.

Beneficially and advantageously, all of the mixtures featuring recycled concrete powder had compressive strengths that fall under the CLSM limit of 8.3 MPa. Additionally, the mixtures with recycled concrete powder and HOFA show lowered compressive strength, which is beneficial for certain applications of CLSM.

Figure 9:
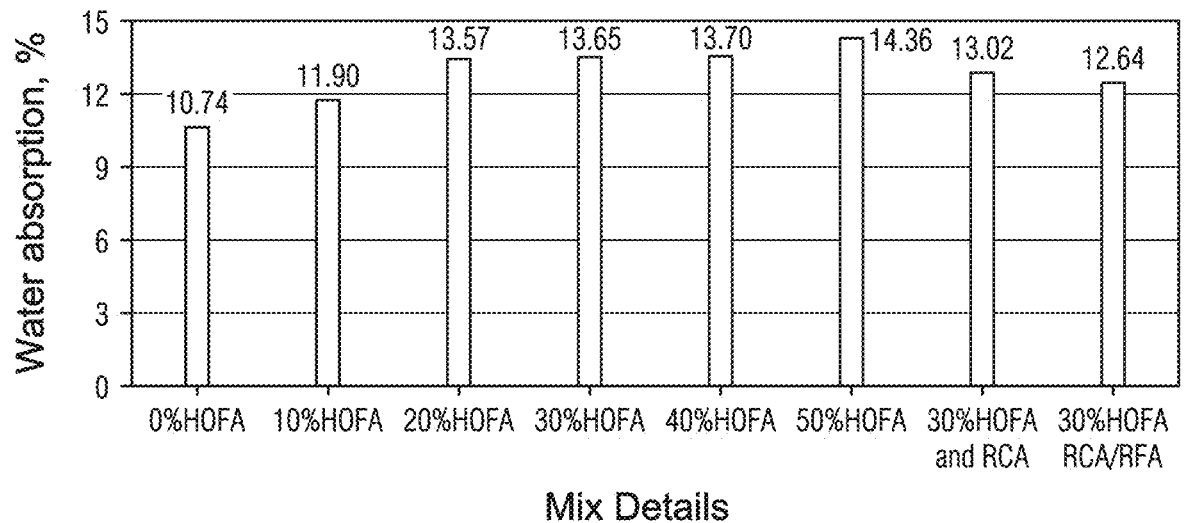
FIG. 9 is a chart of the water absorption results of CLSM mixtures incorporating HOFA.

Referring to FIG. 9, water absorption measurements in percentages for various mixtures of CLSM containing increasing amounts of HOFA are shown. The water absorption was measured in accordance with ASTM C632. From left to right, the mixtures are 1) CLSM with 0 wt % HOFA; 2) CLSM with 10 wt % HOFA; 3) CLSM with 20 wt % HOFA; 4) CLSM with 30 wt % HOFA; 5) CLSM with 40 wt % HOFA; 6) CLSM with 50 wt % HOFA; 7) CLSM with 30 wt % HOFA and recycled coarse aggregate; and 8) CLSM with 30 wt % HOFA and recycled fine aggregate.

Figure 10:
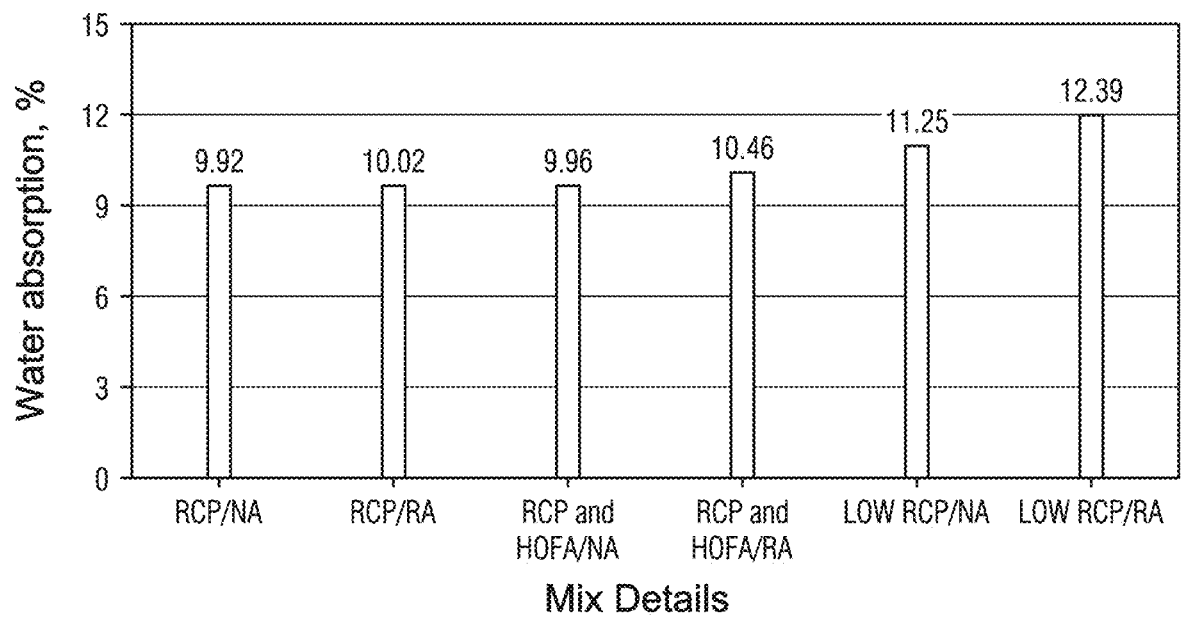
FIG. 10 is a chart of the water absorption results of CLSM mixtures incorporating HOFA and recycled concrete powder.

Referring to FIG. 10, water absorption measurements in percentages for various mixtures of CLSM containing various amounts of recycled concrete powder (abbreviated RCP on the chart) are shown. The water absorption was measured in accordance with ASTM C642. From left to right, the mixtures are 1) CLSM with recycled concrete powder with natural aggregates; 2) CLSM with recycled concrete powder with recycled aggregates; 3) CLSM with recycled concrete powder and HOFA with natural aggregates; 4) CLSM with recycled concrete powder and HOFA with recycled aggregates; 5) CLSM with low levels of recycled concrete powder with natural aggregates; and 6) CLSM with low levels of recycled powder with recycled aggregates.

Beneficially and advantageously, all of the mixtures featuring recycled concrete powder have low water absorption percentages. The water absorption percentages are only marginally higher compared to conventional concrete.

Figure 11:
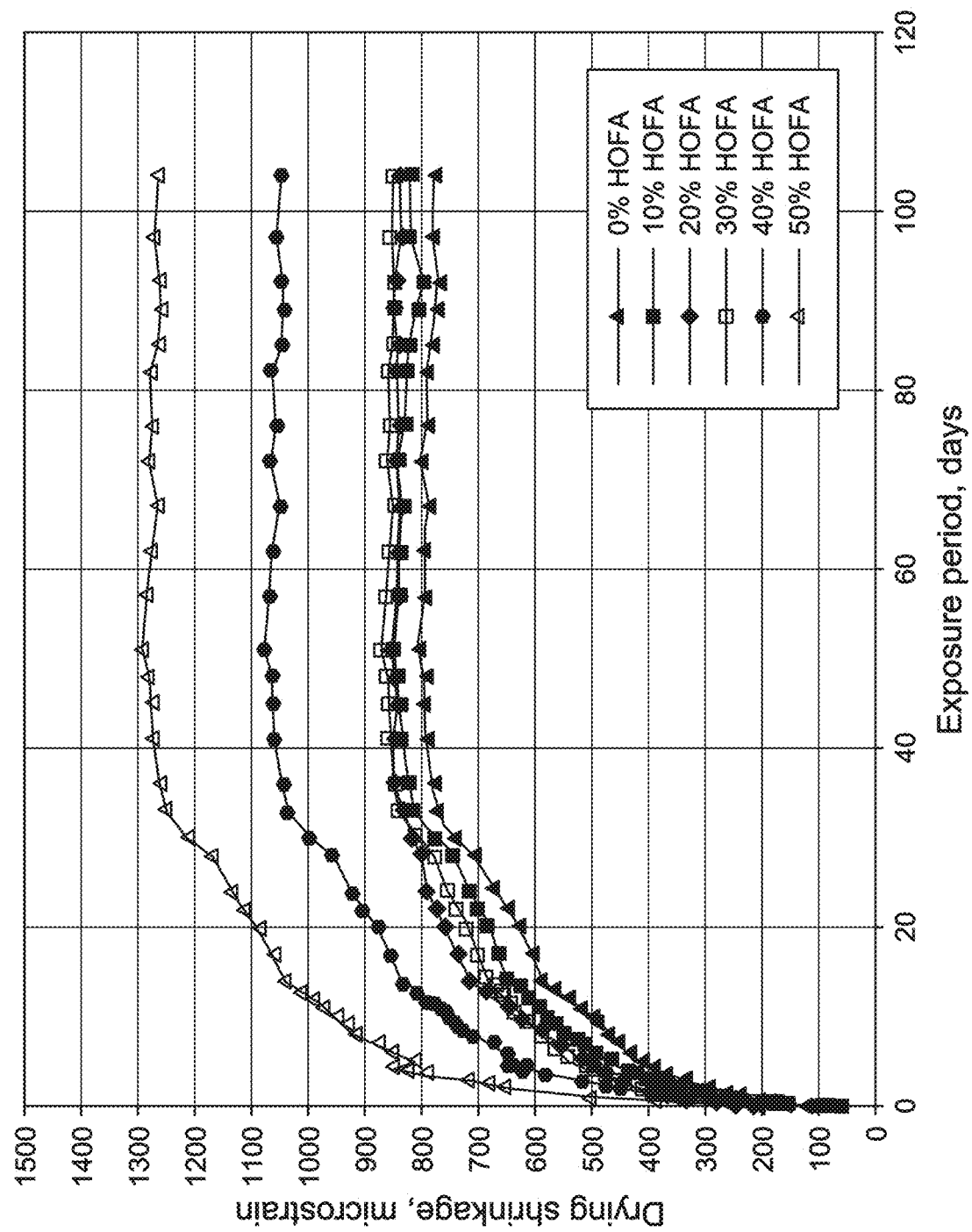
FIG. 11 is a chart of the drying shrinkage strain of CLSM mixtures incorporating HOFA.

Referring to FIG. 11, drying shrinkage measurements in microstrain for various mixtures of CLSM containing increasing amounts of HOFA are shown. The drying shrinkage was measured in accordance with ASTM C157. The drying shrinkage was measured over an exposure period. The mixtures are 1) CLSM with 0 wt % HOFA; 2) CLSM with 10 wt % HOFA; 3) CLSM with 20 wt % HOFA; 4) CLSM with 30 wt % HOFA; 5) CLSM with 40 wt % HOFA; and 6) CLSM with 50 wt % HOFA.

Figure 12:
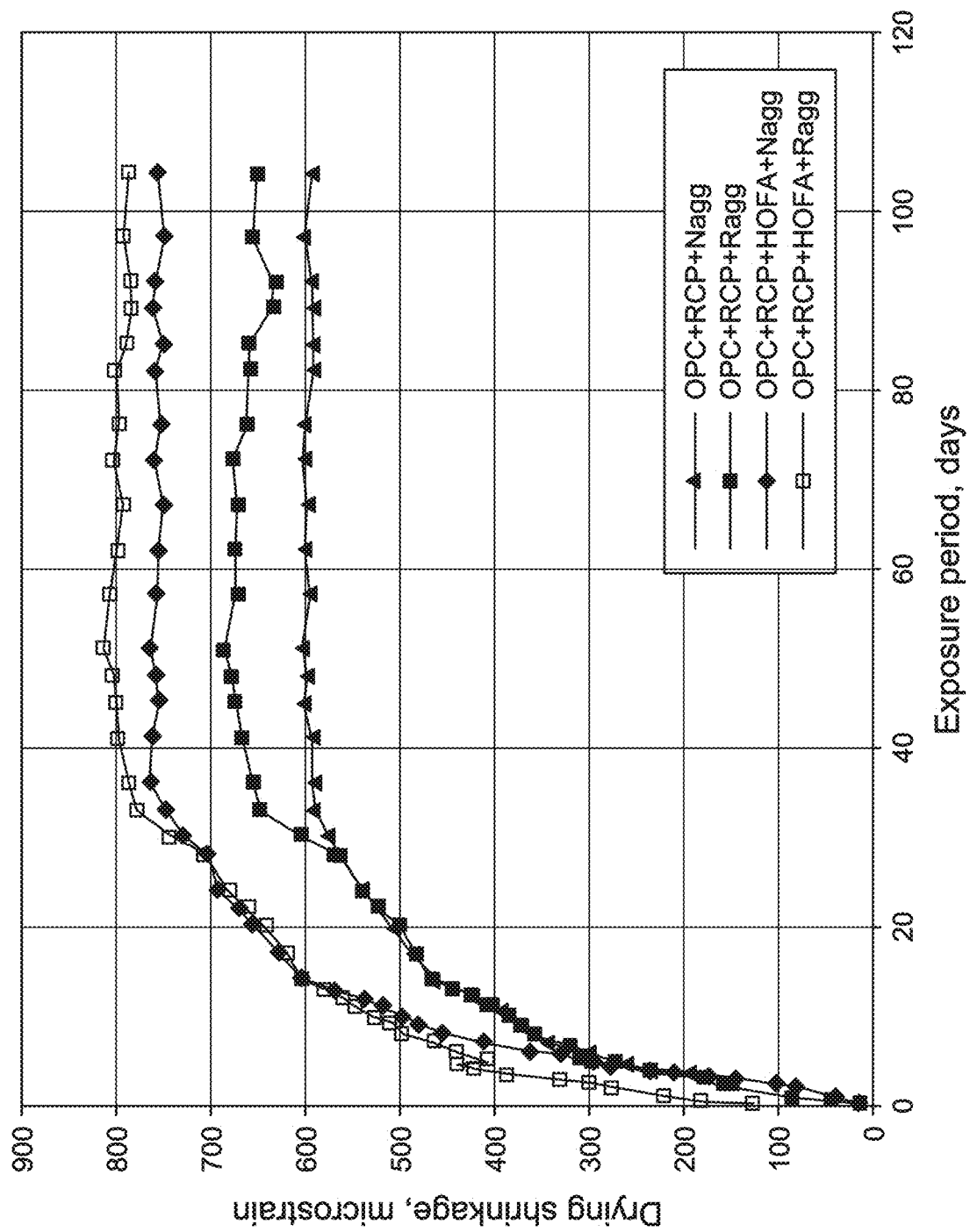
FIG. 12 is a chart of the drying shrinkage strain of CLSM mixtures incorporating HOFA and recycled concrete powder.

Referring to FIG. 12, water absorption measurements in percentages for various mixtures of CLSM containing various amounts of recycled concrete powder (abbreviated RCP on the chart) are shown. The drying shrinkage was measured in accordance with ASTM C157. The drying shrinkage was measured over an exposure period. The mixtures are 1) CLSM with OPC, recycled concrete powder, and natural aggregates; 2) CLSM with OPC, recycled concrete powder, and recycled aggregates; 3) CLSM with OPC, recycled concrete powder, HOFA, and natural aggregates; and 4) CLSM with OPC, recycled concrete powder, HOFA, and recycled aggregates.

Beneficially and advantageously, all of the mixtures featuring recycled concrete powder have drying shrinkage measurements less than or around 800 microstrain.

Embodiments of this disclosure, therefore, are well adapted to carry out the objects and attain the ends and advantages mentioned, as well as others that are inherent. While embodiments of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A controlled low strength material (CLSM), the CLSM comprising:
   an aggregate, the aggregate is in the range of 40 wt % to 90 wt % of the CLSM weight;
   a water, the water is in the range of 10 wt % to 20 wt % of the CLSM weight; and
   cementitious materials, the weight of the cementitious materials are in the range of 2 wt % to 25 wt % of the CLSM weight, wherein the cementitious materials comprise heavy oil fly ash (HOFA) and recycled concrete powder;
   wherein the recycled concrete powder comprises particles less than 0.075 mm.

2. The CLSM of claim 1, wherein the cementitious materials further comprise ordinary Portland cement.

3. The CLSM of claim 1, wherein the CLSM has a 28 day compressive strength of less than or equal to 8.3 MPa.

4. The CLSM of claim 1, wherein the CLSM has a 28 day compressive strength of less than or equal to 2.1 MPa.

5. The CLSM of claim 1, wherein in the recycled concrete powder is derived from the processing of concrete waste into smaller concrete fragments.

6. The CLSM of claim 1, wherein the aggregate is a natural aggregate.

7. The CLSM of claim 1, wherein the aggregate is derived from a recycled concrete.

8. The CLSM of claim 7, wherein the aggregate is a coarse aggregate derived from the recycled concrete.

9. The CLSM of claim 7, wherein the aggregate is a fine aggregate derived from the recycled concrete.

10. The CLSM of claim 1, wherein:
the recycled concrete powder is in the range of 60 wt % to 90 wt % of the cementitious materials weight;
the HOFA is in the range of 10 wt % to 30 wt % of the cementitious materials weight; and.

11. The CLSM of claim 10, wherein the cementitious materials further comprise ordinary Portland cement, and further wherein the ordinary Portland cement is in an amount of less than 30 wt % of the cementitious materials weight.

12. A method for forming a controlled low strength material (CLSM), the method comprising the step of:
mixing together constituent materials, the constituent materials comprising:
an aggregate, the aggregate is in the range of 40 wt % to 90 wt % of the CLSM weight;
a water, the water is in the range of 10 wt % to 20 wt % of the CLSM weight; and
cementitious materials, the weight of the cementitious materials are in the range of 2 wt % to 25 wt % of the CLSM weight, wherein the cementitious materials comprise heavy oil fly ash (HOFA) and recycled concrete powder;
wherein the recycled concrete powder comprises particles less than 0.075 mm.

13. The method of claim 12, wherein the cementitious materials further comprise ordinary Portland cement.

14. The method of claim 12, wherein the CLSM has a 28 day compressive strength of less than or equal to 8.3 MPa.

15. The method of claim 12, wherein the CLSM has a 28 day compressive strength of less than or equal to 2.1 MPa.

16. The method of claim 12, where in the recycled concrete powder is derived from the processing of concrete waste into smaller concrete fragments.

17. The method of claim 12, wherein the aggregate is a natural aggregate.

18. The method of claim 12, wherein the aggregate is derived from a recycled concrete.

19. The method of claim 12, wherein:
the recycled concrete powder is in the range of 60 wt % to 90 wt % of the cementitious materials weight;
the HOFA is in the range of 10 wt % to 30 wt % of the cementitious materials weight; and.

20. The method of claim 19, wherein the cementitious materials further comprise ordinary Portland cement, and further wherein the ordinary Portland cement is in an amount of less than 30 wt % of the cementitious materials weight.

* * * * *